Jan. 2, 1951   J. DIAZ-COMPAIN   2,536,729
CLARIFIER
Filed Oct. 6, 1946
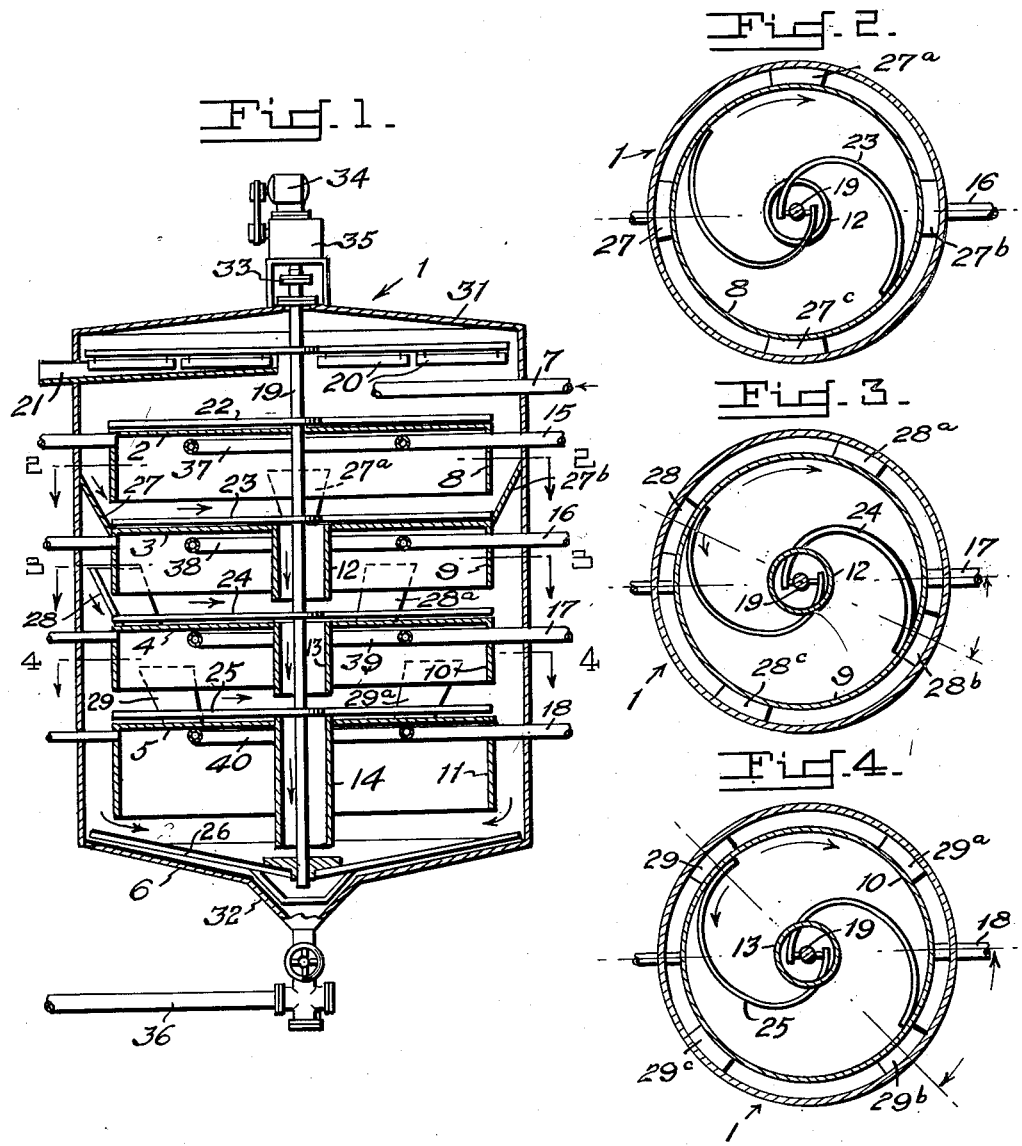
Inventor
Jeronimo Diaz-Compain
By Henry C. Parker
Attorney …

UNITED STATES PATENT OFFICE

2,536,729
CLARIFIER

Jerónimo Diáz-Compain, Camaguey-Central Senado, Cuba

Application October 8, 1946, Serial No. 702,042

8 Claims. (Cl. 210—55)

This invention relates to clarifiers; and it comprises a clarifier suitable for treating industrial liquors, such as those obtained in the defecation of sugar juices, in sewage disposal, in water purification, in water softening and the like, to remove suspended solids therefrom, said clarifier comprising a tank, a plurality of substantially-horizontal, superposed trays mounted centrally in said tank, said trays having depending central and peripheral annular flanges, said central flanges forming a discharge conduit for solids precipitated on said trays, said peripheral flanges extending close to the tops of the trays beneath but leaving therebetween annular passageways, said trays and flanges defining a corresponding plurality of superposed clarifying zones and, with the tank wall, defining a peripheral downtake, means for supplying a liquor to be clarified at the top of said tank, a plurality of inclined baffles mounted between the tops of the trays and the tank wall for deflecting solids and liquor from said downtake through said annular passageways and into said clarifying zones, said baffles being advantageously inclined to the horizontal at an angle of at least about 60° so that solids are prevented from collecting thereon, being stepped from tray to tray downwardly and being of such width and so constructed and arranged that substantially equal bodies of liquor and solids are deflected from said downtake into each clarifying zone, means for sweeping solids precipitated on said trays into said central discharge passageway and into the bottom of said tank, and means for withdrawing solids from the bottom of said tank; all as more fully hereinafter set forth and as claimed.

Many types of multi-tray clarifiers have been proposed for clarifying industrial liquors. In some of these designs solids precipitated on top of the trays have been discharged centrally through depending boots to the bottom of the tank while in other designs the solids have been discharged through a peripheral downtake defined by the tank wall and depending peripheral flanges mounted on the trays. Both of these designs have suffered from the disadvantage that the quantity of solids handled by the clarifying zones has increased from zone to zone downwardly. This has seriously limited the capacities of the lower clarifying zones. Several proposals have been made to equalize the clarifying zones with respect to the amount of solids handled but none of the designs proposed with this in view has come into commercial use. And none of these proposed designs has been even theoretically capable of producing the desired result, that is, the distribution of solids to each clarifying zone so that each zone receives an equal amount.

I have discovered that it is possible to overcome the described difficulties, in clarifiers provided with separate downtakes for feeding raw liquor to the clarifying zones and for discharging precipitated solids from these zones, by the rather simple expedient of mounting inclined baffles in the downtake feeder and so constructed and arranged as to deflect equal segments of the downflow from the downtake into the clarifying zones. In designing my new clarifier the total area of the downtake feeder is first divided into equal sections or segments, which in number equal the number of the trays or a small multiple thereof, and the trays, with the exception of the top tray are then equipped with inclined baffles which, in vertical projection, have substantially the shape and area of these segments and are so-constructed and arranged as theoretically to divert corresponding segments of the downflow into their respective clarifying zones. The bottom of the tank serves to divert the final segment into the lowest clarifying zone. The number of baffles per tray can be varied so long as the total area in vertical projection is equal to the area of the described segments.

My new design is advantageous for the reason that many of the clarifiers now in use can be readily converted into this design, merely by mounting a few inclined baffles in their downtakes. The baffles are, of course, inexpensive and they can be readily installed without any large labor cost. And I have found that, when these baffles are installed, a surprising increase in the clarifying capacity is obtained and that the capacity of the clarifying zone just above the bottom zone will not vary appreciably from the capacity of the top zone. This is believed to be a new result in the clarifying art.

Of course the bottom clarifying zone, which collects all the solids precipitated on the trays, of necessity is forced to handle all the solids precipitated in the clarifier. So this zone should be made of greater depth than the upper clarifying zones in order to obtain an equal capacity in this zone. The other zones can be made all of the same depth.

Theoretically it might have been expected that the upper clarifying zones in my clarifier would collect a slightly larger proportion of the solids than the lower zones, owing to the inevitable partial equalization of the solids distribution after the raw liquor has passed the baffles. The solid particles passing downwardly in the raw liquor do not act like drops of rain striking a baffle since a portion remains in suspension and merely passes around the baffles. Also some liquor mixed with solids enters the clarifying zones through the annular passageways between the depending flanges and the tops of the trays at points where no baffles are provided. These various factors appear to balance out in practice, since I have never been able to detect in my design any substantial difference in the amount of solids diverted into the various clarifying zones with the exception, of course, of the bottom zone.

My design also has the important advantage that any solids precipitated on the trays are propelled to a separate discharge passageway and are therein conducted directly to the bottom of the tank without being remixed with the raw liquor. There is therefore no chance that the flocculated solids will be deflocculated and resuspended in the liquor. My preferred design provides an annular passageway for the liquor entering the clarifying zones which is of substantial cross-sectional area. The rate of flow through this passageway is thus very low. Turbulence is absent. And this design provides for a parallel flow of solids and liquor which also causes minimum re-suspension of solids and intermixing of flocculated solids with raw liquor. The solids pass in a single direction and once only across the trays.

My invention can be explained more specifically by reference to the accompanying drawing which shows, more or less diagrammatically a preferred embodiment of my clarifier. In this showing, Fig. 1 is a vertical cross section through the center of my clarifier, Fig. 2 is a horizontal section taken along the line 2—2 of Fig. 1, Fig. 3 is a horizontal section taken along the line 3—3 of Fig. 1, while Fig. 4 is a horizontal section taken along the line 4—4 of Fig. 1.

In the various figures like parts are designated by like reference numerals. My clarifier comprises a cylindrical tank, shown generally at 1, usually provided with a top 31 and with a sloping bottom 6 having a central sump 32 for collecting sludge. Suspended in the tank by means not shown are a plurality of substantially horizontal trays, 2, 3, 4 and 5, these trays being provided with depending peripheral flanges 8, 9, 10 and 11 and with central annular flanges or boots 12, 13 and 14 which define a discharge passageway for precipitated solids. A central shaft 19 is mounted in the tank, supported by a bearing 33 and driven by motor 34 operating through gear reducer 35. The top of the tank serves as a coagulating chamber and raw liquor to be clarified is fed to this chamber through the pipe 7. This chamber is provided with a foam removing launder 21 and sweeps 20 which are rotated by the shaft 19 and push the foam into the launder. Scrapers of spiral form 22, 23, 24 and 25 are mounted on top of the trays and rotated by shaft 19. The top scraper is adapted to propel the solids precipitated on the top tray into the peripheral downtake while the others are adapted to propel the solids into the central discharge formed by the boots, as is evident from Figs. 2, 3 and 4. The bottom of the tank is also provided with a conventional scraper 26 for propelling the sludge into the sump 32, from which point it is discharged through the pipe 36. Clear liquor draw-off manifolds 37, 38, 39 and 40 are provided in the tops of the clarifying zones, these being connected to the draw-off pipes 15, 16, 17 and 18, respectively. The inclined deflecting baffles of the present invention are shown at 27, 27a, 27b and 27c for the next to the top tray, at 28, 28a, 28b and 28c for the lower tray and 29, 29a, 29b and 29c for the bottom tray. It will be noted that these baffles are stepped from tray to tray downwardly so that they adjoin but do not overlap vertically. It will also be noted that these baffles divide the cross section of the peripheral downtake into segments, and that the sum of the areas of these segments is equal to the cross section of the downtake. The tank bottom can be considered as constituting the baffles deflecting liquor into the bottom clarifying zone. Four baffles are provided for each tray in the embodiment shown in the drawing but the number employed is not important provided that the downtake is divided as described. The cross section of the downtake is divided into four equal parts, one for each clarifying zone, by the baffle segments, which divert one-fourth of the down flowing liquor into each of the four clarifying zones.

The dimensions and spacing of the inclined baffles of this invention can be calculated readily. If the number of clarifying zones is represented by $a$ and the number of baffles per zone is represented by $b$, then the angle between the centers of the baffles from one tray to the next lower is found by dividing 360° by the factor $a \times b$. For the case illustrated in the drawing:

$$\frac{360}{4 \times 4} = 22° 30'$$

The width of these deflectors is found by dividing the circumference of the downtake by the factor $a \times b$. For a 20 foot tank equipped with 4 baffles per tray, for example, the width of the individual baffles would be $$\frac{20 \times 12 \times 3.1416}{4 \times 4} = 47 \text{ inches}$$

It will be understood that the installation of the baffles as described assures the necessary surface to direct the flow of solids into the clarifying zones while the inclination of 60° or more prevents the deposition of solids on the baffles. Any mud which might become deposited on the baffles slides down on to the trays from which point it is picked up by the scrapers and delivered to the central downtake.

While I have described what I consider to be the most advantageous embodiment of my invention it is evident, of course, that many modifications can be made in the specific structure described without departing from the purview of this invention. Thus, while I have shown a construction in which the peripheral downtake is divided into the same number of segments as there are clarifying zones, it is advantageous in the clarification of some types of liquors to have the baffles somewhat wider so as to reduce the proportion of solids diverted into the bottom zone. The factor representing the number of clarifying zones in the two equations which have been given, can be varied from $a$ to $a-1$, for example. In the latter case the bottom clarifying zone would theoretically receive none of the solids passing downwardly through the downtake. Practically, of course, some of the suspended solids will inevitably pass into this zone. I have shown the top tray closed at the center but it is possible to supply a boot for this tray and to scrape the solids deposited thereon into this boot. However, for the particular purposes of this invention it is better to employ a solid top tray in order to ensure that substantially all the raw liquor will flow down the peripheral downtake from which point it can be diverted into the clarifying zones as described. I have stated that the trays should be substantially horizontal which means that they can be dished or belled, if desired. The term "substantially horizontal" as used in the claims is intended to cover trays which may be sloped at any angle up to that causing solids to slide therefrom and which therefore require scrapers for removal of the sludge. The direction of slope is not important. Any number of trays can be employed and any type of scrapers may be employed. Any type of industrial liquor containing solids in suspension therein or which requires treatment with chemicals to produce a precipitate, can be clarified with my apparatus. If desired precipitating chemicals can be added directly to the tank or by means of the inlet pipe. Other modifications of my invention which fall within the purview of the following claims will be immediately evident to those skilled in this art.

What I claim is:

1. A clarifier comprising a cylindrical tank, a plurality of superposed substantially horizontal trays mounted centrally in said tank, central boots mounted on and depending from at least the trays below the top tray and defining a discharge conduit for precipitated solids, peripheral depending flanges mounted on the trays and defining, with said trays, central clarifying zones and, with the tank wall, a peripheral downtake for the raw liquor to be clarified, said peripheral flanges extending close to the tops of the trays beneath and leaving therebetween an annular passageway for liquor to be clarified passing into said clarifying zones, means for supplying a raw liquor to be clarified at the top of said tank, a plurality of baffles inclined to the vertical extending radially from the peripheries of the trays beneath the top tray radially to the tank wall for deflecting raw liquor and solids from said downtake into said clarifying zones, said baffles being stepped from tray to tray downwardly and being so constructed and arranged that substantially equal proportions of the solids in said downtake are deflected into each of said clarifying zones, means for withdrawing clarified liquor from the tops of said clarifying zones, scraper means for scraping solids precipitated on top of said trays into said central discharge conduit, a source of power for driving said scraper means and means for withdrawing solids from the bottom of said tank.

2. The clarifier of claim 1 wherein said baffles are inclined to the vertical at an angle not substantially less than about 60°.

3. The clarifier of claim 1 wherein the central discharge conduit starts at the second tray from the top, the top tray being solid and means are provided for propelling solids precipitated on said top tray into the peripheral downtake.

4. The clarifier of claim 1 wherein said baffles are so constructed that the area of the baffles for each of the trays in vertical projection is equal and that the sum of these areas is equal to the cross sectional area of the downtake.

5. The clarifier of claim 1 wherein the baffles mounted on each tray in vertical projection adjoin but do not overlap the baffles of adjacent trays.

6. The clarifier of claim 1 wherein the cross sectional area of the downtake is divided by said inclined baffles into a plurality of equal parts corresponding in number to the number of clarifying zones and said inclined baffles in vertical projection correspond in area to the areas of said equal parts.

7. The clarifier of claim 1 wherein said inclined baffles are in the form of radial segments of said downtake which in vertical projection divide the area of the downtake into a number of portions of substantially the same area equal in number to a factor within the range of $a$ to $a-1$, wherein $a$ represents the number of clarifying zones and wherein the width of the baffles and the angle in vertical projection between baffles on adjacent trays correspond substantially to the values obtained by dividing, respectively, the circumference of the downtake and 360° by a factor varying between $a \times b$ and $(a-1) \times b$, wherein $b$ represents the number of baffles per tray.

8. A clarifier comprising a cylindrical tank, a substantially horizontal tray mounted centrally in the top of the tank and defining with the tank wall an upper coagulating zone for liquor to be clarified, the periphery of said tray being spaced from the tank wall to provide a peripheral discharge from the coagulating zone, means for feeding a liquor to be clarified into said coagulating zone, means for propelling solids precipitated on said tray into said peripheral discharge, a plurality of additional superposed substantially horizontal trays mounted centrally in the tank beneath said top tray, central depending boots mounted on said additional trays and defining a discharge conduit for precipitated solids, peripheral flanges mounted on all trays and defining, with said trays, central clarifying zones and, with the tank wall, a peripheral downtake for the raw liquor to be clarified, said peripheral flanges extending close to the tops of the trays beneath and leaving therebetween an annular passageway for the liquor to be clarified passing into said clarifying zones, a plurality of baffles inclined to the vertical extending radially from the peripheries of the trays beneath the top tray to the tank wall for deflecting raw liquor and solids from said downtake into said clarifying zones, said baffles being stepped from tray to tray downwardly and being so constructed and arranged that in vertical projection they divide the cross sectional area of the downtake into substantially equal segments leading into each of the clarifying zones above the bottom clarifying zone, whereby substantially equal portions of the liquor and solids passing downwardly in said downtake tend to be deflected into each of said clarifying zones, means for withdrawing clarified liquor from the tops of said clarifying zones, scraper means for scraping solids precipitated on top of said trays into said central discharge conduit, a source of power for driving said scraper means and means for withdrawing solids from the bottom of said tank.

JERÓNIMO DÍAZ-COMPAIN.

REFERENCES CITED

The following references are of record in the file of this patent:

UNITED STATES PATENTS

| Number | Name | Date |
|---|---|---|
| 1,503,644 | Dorr | Aug. 5, 1924 |
| 2,003,357 | Gilchrist | June 4, 1935 |
| 2,103,796 | Seip | Dec. 28, 1937 |
| 2,103,828 | Seip | Dec. 28, 1937 |
| 2,340,132 | McHugh et al. | Jan. 25, 1944 |